United States Patent
Chang

(10) Patent No.: US 9,426,840 B2
(45) Date of Patent: Aug. 23, 2016

(54) METHOD OF APPLYING DISCONTINUOUS RECEPTION OPERATION AND RELATED COMMUNICATION DEVICE

(75) Inventor: Po-Yu Chang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 298 days.

(21) Appl. No.: 13/212,188

(22) Filed: Aug. 18, 2011

(65) Prior Publication Data

US 2012/0044847 A1 Feb. 23, 2012

Related U.S. Application Data

(60) Provisional application No. 61/374,622, filed on Aug. 18, 2010.

(51) Int. Cl.
*G08C 17/00* (2006.01)
*H04W 76/04* (2009.01)

(52) U.S. Cl.
CPC .................... *H04W 76/048* (2013.01)

(58) Field of Classification Search
CPC .................................................. H04W 76/048
USPC .......................... 370/311, 321, 332; 455/436
See application file for complete search history.

(56) References Cited

U.S. PATENT DOCUMENTS

| 2008/0090573 A1* | 4/2008 | Kim et al. ...................... 455/436 |
| 2009/0068955 A1 | 3/2009 | Machii |
| 2010/0317345 A1* | 12/2010 | Futaki et al. .................. 455/436 |

FOREIGN PATENT DOCUMENTS

| EP | 2 120 479 A1 | 11/2009 |
| WO | 2010078365 A1 | 7/2010 |

OTHER PUBLICATIONS

European patent application No. 11006772.5, European Search Report mailing date: Dec. 9, 2011.
NEC, "Details of DRX operation in carrier aggregation", 3GPP TSG RAN2 Meeting #71, R2-104664, Aug. 23-27, 2010, Madrid, Spain, XP002664375, p. 1-3.
NEC, "Details on DRX with carrier aggregation", 3GPP TSG RAN2 Meeting #68bis, R2-100283, Jan. 18-22, 2010, Valencia, Spain, XP002664376, p. 1-3.
HTC, "Clarification on applying the common DRX operation to the SCell upon activation", 3GPP TSG-RAN WG2 Meeting #73, R2-111279, Feb. 21-25, 2011, Taipei, Taiwan, XP050493763, p. 1-2.
3GPP TS 36.300 V10.0.0 (Jun. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), XP050441905, p. 1-183.

(Continued)

*Primary Examiner* — Phuc Tran
(74) *Attorney, Agent, or Firm* — Winston Hsu; Scott Margo

(57) ABSTRACT

A method of applying DRX operation for a mobile device in a wireless communication system is disclosed. The mobile device is configured with a primary serving cell and at least one secondary serving cell, and the DRX operation is already applied to the activated serving cell (e.g. primary serving cell), but not applied to the deactivated serving cell. The method comprises receiving a control element, wherein the control element is used for activating the at least one secondary serving cell; and applying the DRX operation to the at least one secondary serving cell when this serving cell's activation/deactivation state has just been changed from deactivation to activation state according to the control element.

6 Claims, 4 Drawing Sheets

(56) References Cited

OTHER PUBLICATIONS

3GPP TS 36.300 V10.2.0 (Dec. 2010) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

3GPP TS 36.321 V9.3.0 (Jun. 2010) Technical Specification 3rd Generation Partnership Project; Technical Specification Group Radio Access Network; Evolved Universal Terrestrial Radio Access (E-UTRA); Medium Access Control (MAC) protocol specification (Release 9).

* cited by examiner

METHOD OF APPLYING DISCONTINUOUS RECEPTION OPERATION AND RELATED COMMUNICATION DEVICE

CROSS REFERENCE TO RELATED APPLICATIONS

This application claims the benefit of U.S. Provisional Application No. 61/374,622 filed on Aug. 18, 2010 and entitled "DRX of secondary serving cell", the contents of which are incorporated herein.

BACKGROUND OF THE INVENTION

1. Field of the Invention

The application relates to a method and a related communication device used in a wireless communication system and related communication device, and more particularly, to a method of applying discontinuous reception (DRX) operation and a related communication device in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as to user equipments (UEs).

A long term evolution-advanced (LTE-A) system, as its name implies, is an evolution of the LTE system, considering relaying for cost-effective throughput enhancement and coverage extension. The LTE-A system includes all of the features of the LTE system and several new ones, the most important of which are: carrier aggregation (CA), enhanced multi-antenna support and relaying. The LTE system provides extensive support for deployment in spectrum allocations of various characteristics, with transmission bandwidths ranging from 1.4 MHz up to 20 MHz. In the LTE-A system, the transmission bandwidth can be further extended with carrier aggregation wherein multiple component carriers are aggregated and jointly used for transmission to/from a signal UE. In general, up to five component carriers can be aggregated, allowing for transmission bandwidth up to 100 MHz.

When CA is configured, the UE only has one RRC connection with the network. At RRC connection establishment/re-establishment, one serving cell provides the security input (one ECGI, one PCI and one ARFCN) and the NAS mobility information (e.g. TAI) similarly as in Rel-8/9 under 3GPP. This cell is referred to as the Primary serving cell (PCell). In the downlink, the carrier corresponding to the PCell is the Downlink Primary Component Carrier (DL PCC) while in the uplink it is the Uplink Primary Component Carrier (UL PCC). Depending on UE capabilities, Secondary serving cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC). The configured set of serving cells for a UE therefore always consists of one PCell and one or more SCells.

According to the structure of LTE/LTE-A system, Discontinuous Reception (DRX) is applied to a MAC (Media Access Control) layer for allowing UE to enter a standby mode during certain periods and stopping monitoring a Physical down Link Control Channel (PDCCH) carrying information about resource allocation of a DL-SCH (Downlink Shared Channel) and uplink (UL) scheduling grants. The DRX functionality is operated based on the following parameters that can be configured by a DRX-configuration information element (IE) of a RRC (radio resource control) layer. The related DRX parameters include:

A DRX Cycle providing a periodic repetition of a "On Duration" followed by a possible inactivity period, where the DRX Cycle is a short or a long DRX cycle;

A DRX Inactivity Timer providing the number of consecutive PDCCH-subframe(s) after successfully decoding a PDCCH indicating an initial UL/DL user data transmission;

A DRX Retransmission Timer providing the maximum number of consecutive PDCCH-subframe(s) as soon as a DL retransmission is expected by the UE;

A DRX Short Cycle Timer providing the number of consecutive subframe(s) during which the UE shall follow the short DRX cycle after the DRX Inactivity Timer has expired;

A HARQ RTT Timer providing the minimum amount of subframe(s) before a DL HARQ retransmission is expected by the UE; and An On Duration Timer providing the number of consecutive PDCCH-subframe(s) at the beginning of a DRX Cycle. The UE monitors the PDCCH only during the On Duration.

In Rel-10 of 3GPP, the UE applies a same DRX operation to a PCell and all activated SCells in carrier aggregation. The UE is configured with a PCell and a deactivated SCell. Once drx-InactivityTimer expires or a DRX Command MAC control element is received, the UE applies the DRX operation to the PCell and the SCell is still deactivated (i.e. the UE didn't apply the DRX to the deactivated SCell on that time). After that, the UE receives a Activation/Deactivation MAC CE activating the SCell and the SCell is activated. However the UE may not apply the DRX operation to the SCell and continue to receive a PDCCH on the SCell on an off duration in the DRX operation. This wastes UE power.

SUMMARY OF THE INVENTION

A method of applying discontinuous reception (DRX) operation in a wireless communication system is provided.

A method of applying DRX operation for a mobile device in a wireless communication system is disclosed. The mobile device is configured with a primary serving cell and at least one secondary serving cell, and the DRX operation has been applied to the activated serving cell (i.e. the Pcell and the activated SCells), but has not applied to the deactivated serving cell yet. The method comprises receiving a control element, wherein the control element is used for activating the at least one secondary serving cell; and applying the DRX operation to the secondary serving cell, when this serving cell's activation/deactivation state is changed from deactivation to activation state according to the control element.

A communication device for applying DRX operation in a wireless communication system is disclosed. The communication device is configured with a primary serving cell and at least one secondary serving cell, and the DRX operation has been applied to the activated serving cell (i.e. the Pcell and the activated SCells), but has not applied to the deactivated serving cell yet. The communication device comprises means for receiving a control element, wherein the control element is used for activating the at least one secondary serving cell; and means for applying the DRX operation to the secondary serving cell, when this serving cell's activation/deactivation state is changed from deactivation to activation state according to the control element.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
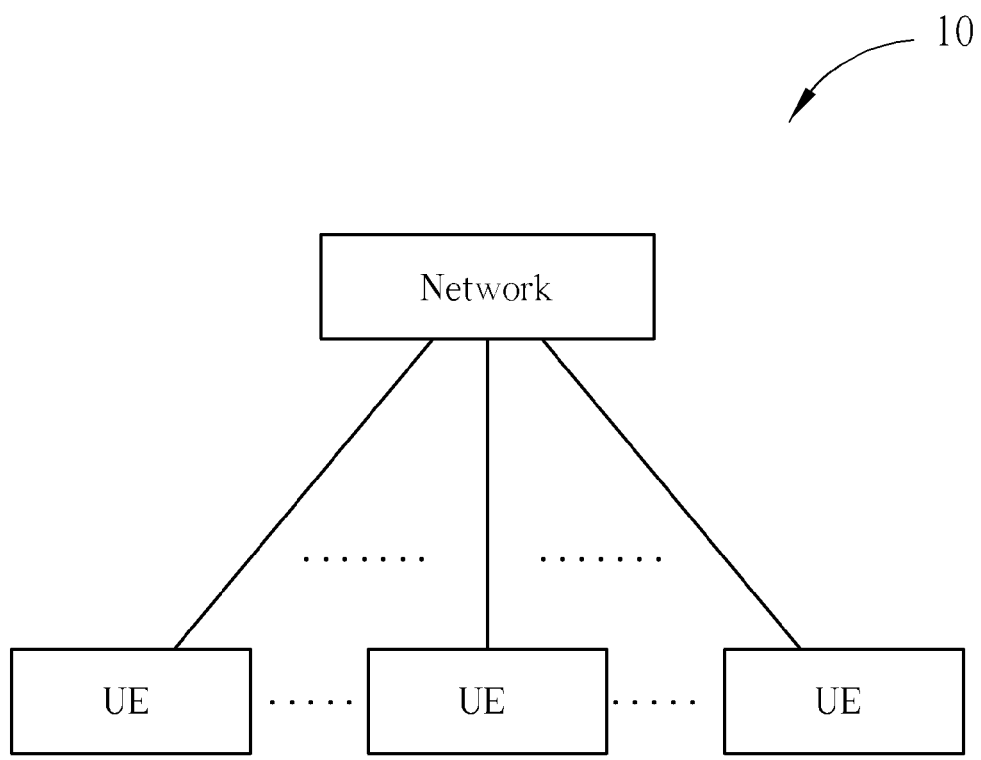
FIG. 1 is a schematic diagram of an exemplary wireless communication system.

Please refer to FIG. 1, FIG. 1 is a schematic diagram of an exemplary wireless communication system 10. The wireless communication system 10 can be an LTE-Advanced system, or other mobile communication systems (e.g. LTE, WCDMA, HSPA, GSM, EDGE, etc.). The wireless communication system 10 is briefly composed of a network and a plurality of user equipments (UEs), as the structure illustrated in FIG. 1. In the LTE-Advanced system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
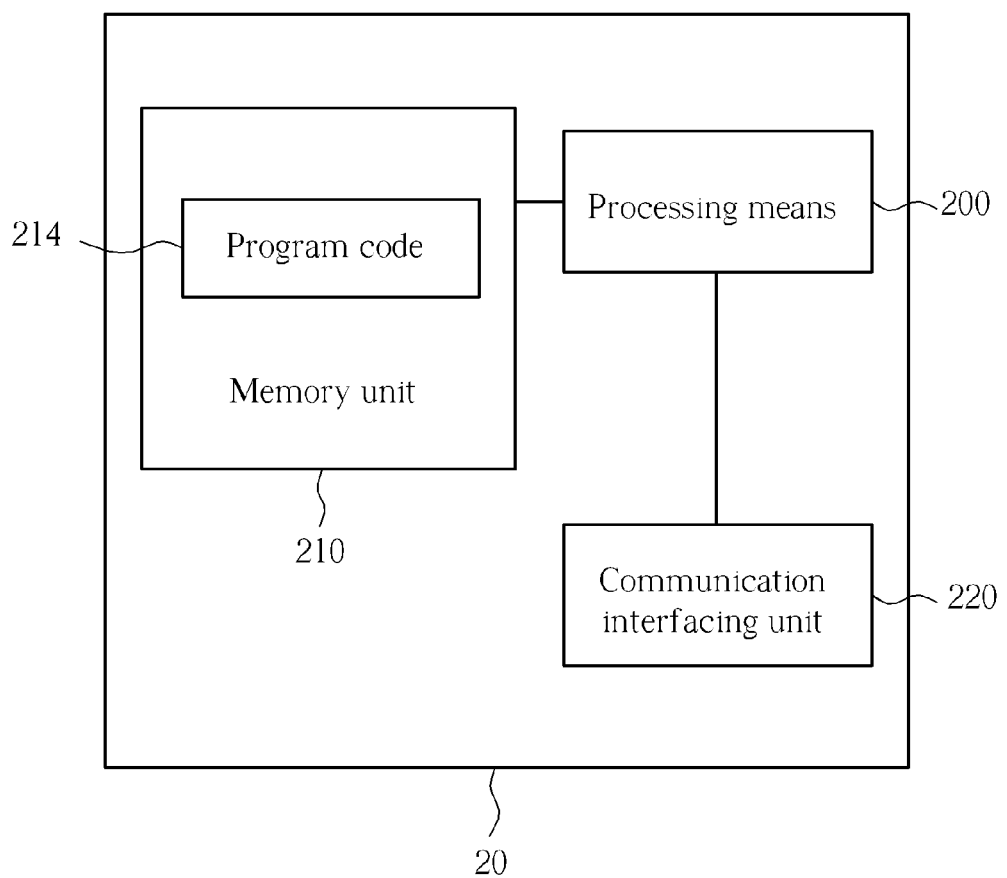
FIG. 2 is a schematic diagram of an exemplary communication device.

Please refer to FIG. 2, FIG. 2 is a schematic diagram of an exemplary communication device 20. The communication device 20 can be the UE or the network shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver for wirelessly communicating with the network according to processing results of the processing means 200.

Figure 3:
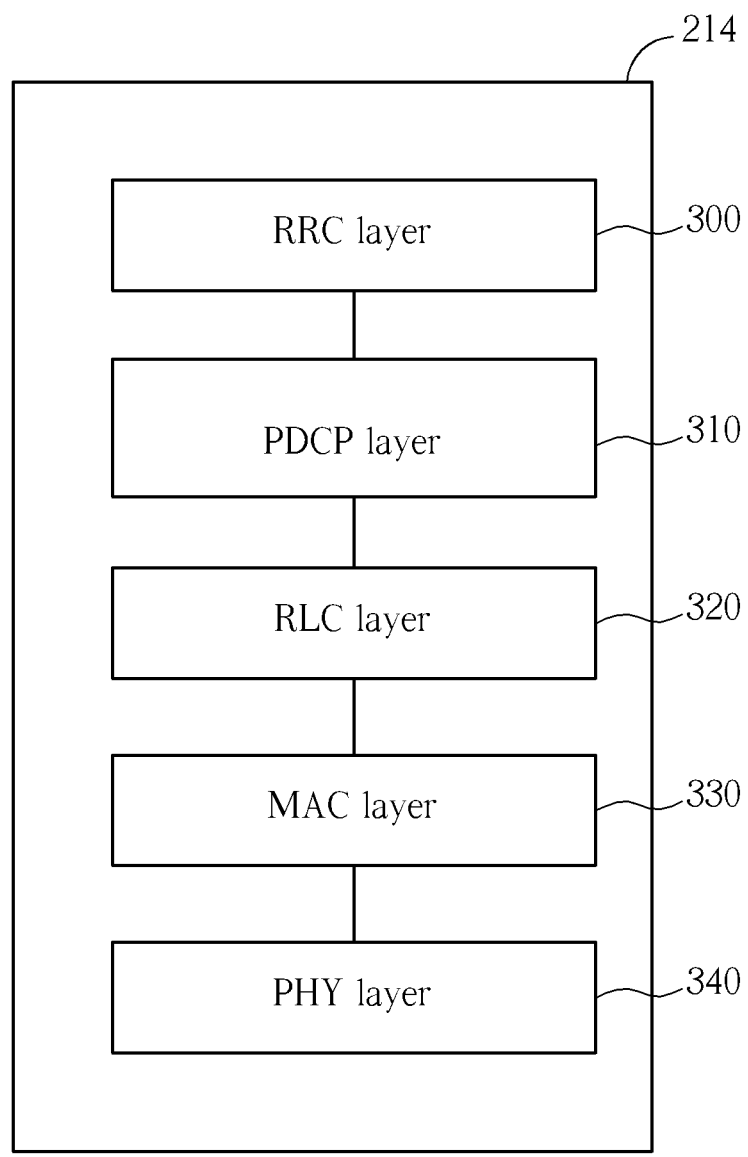
FIG. 3 illustrates the program code in FIG. 2.

Please refer to FIG. 3, which illustrates the program code 214 in FIG. 2. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340.

The PHY layer 340 can monitor a PDCCH (Physical Downlink Control Channel) for maintaining a subframe number and receiving configuration/resource information for the MAC layer 330, RRC layer 300, etc. The MAC layer 330 has discontinuous reception (DRX) functionality allowing periodic PDCCH reception followed by a possible inactivity period. The DRX is operated with a long DRX cycle or a short DRX cycle, each including a "On Duration" during which the PDCCH reception is executed. The "On Duration" is set according to an On Duration Timer.

Figure 4:
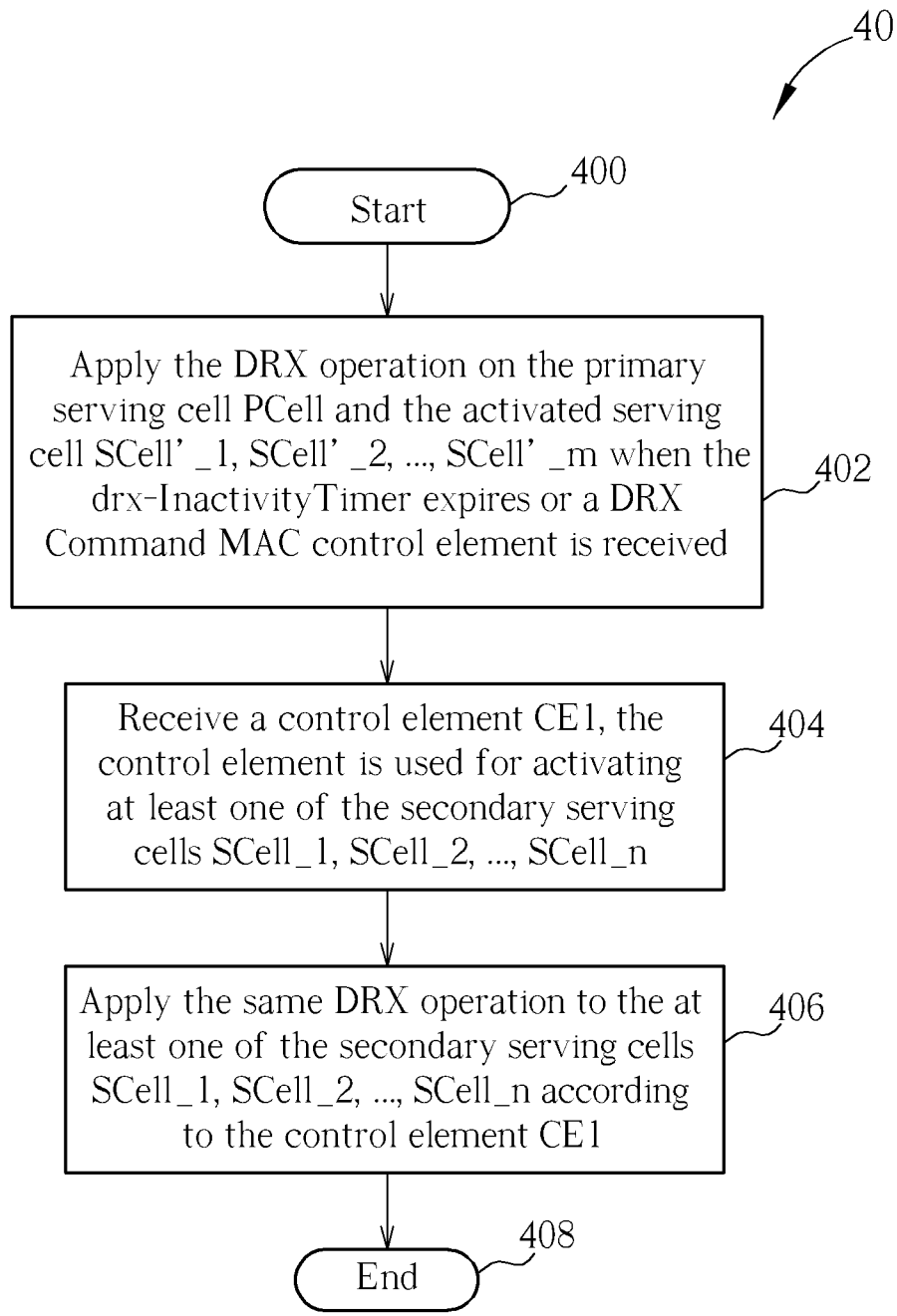
FIG. 4 is a flow chart of an exemplary process.

Please refer to FIG. 4, which is a flow chart of an exemplary process 40. The process 40 is used for applying DRX operation for a UE in a wireless communication system. The UE is configured with a primary serving cell PCell and secondary serving cells SCell_1, SCell_2, . . . , SCell_n and SCell'_1, SCell'_2, . . . , SCell'_m, where n and m are integers (Note: so far, there are at most four secondary serving cells can be configured with the UE). The primary serving cell PCell and the secondary serving cells SCell_1, SCell_2, . . . , SCell_n and SCell'_1, SCell'_2, . . . , SCell'_m are serving cells of the UE. The secondary serving cells SCell_1, SCell_2, . . . , SCell_n are deactivated. The secondary serving cells SCell'_1, SCell'_2, . . . , SCell'_m are activated. The wireless communication system could be the wireless communication system 10. The process 40 can be compiled into the program code 214 and includes the following steps:

Step 400: Start.

Step 402: Apply the DRX operation on the primary serving cell PCell and the activated serving cell SCell'_1, SCell'_2, . . . , SCell'_m when the drx-InactivityTimer expires or a DRX Command MAC control element is received.

Step 404: Receive a control element CE1, the control element is used for activating at least one of the secondary serving cells SCell_1, SCell_2, . . . , SCell_n.

Step 406: Apply the same DRX operation to the at least one of the secondary serving cells SCell_1, SCell_2, . . . , SCell_n according to the control element CE1.

Step 408: End.

According to the process 40, once the drx-InactivityTimer expires or a DRX Command MAC control element is received, the UE will apply the DRX operation on the activated serving cell PCell and SCell'_1, SCell'_2, . . . , SCell'_m, but didn't apply the same DRX operation to the deactivated Scells SCell_1, SCell_2, . . . , SCell_n. After that, the UE receives the control element CE1. The control element CE1, preferably, can be an Activation/Deactivation MAC control element and is used for activating at least one of the secondary serving cells SCell_1, SCell_2, . . . , SCell_n. When the UE receives the control element CE1, at least one of the secondary serving cells SCell_1, SCell_2, . . . , SCell_n get activated. The UE applies the same DRX operation to the at least one of the secondary serving cells SCell_1, SCell_2, . . . , SCell_n. When the DRX is applied to the at least one of the secondary serving cells SCell_1, SCell_2, . . . , SCell_n, the UE does not monitor PDCCH for resource allocation of a DL-SCH (Downlink Shared Channel) and uplink (UL) scheduling grants from the at least one of the secondary serving cells SCell_1, SCell_2, . . . , SCell_n, in off duration of the DRX operation. As a result, the UE can save power.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results applies the DRX operation in the wireless communications system 10.

To sum up, the UE is configured with the primary serving cell and at least one secondary serving cell. The UE has been applied DRX operation on the primary serving cell, but not on the deactivated secondary serving cells yet (i.e. SCell_1, SCell_2, . . . , SCell_n). When the UE receives the Activation/Deactivation MAC control element, at least one of the secondary serving cells get activated. The UE applies the same DRX operation to the secondary serving cells which their activation/deactivation state have just been changed from deactivation to activation state according to the Activation/Deactivation MAC control element. Consequently, the UE does not monitor PDCCH for resource allocation of a DL-SCH (Downlink Shared Channel) and uplink (UL) scheduling grants from the secondary serving cells in off duration of the DRX operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of applying discontinuous reception (DRX) operation for a mobile device in a wireless communication system, the method comprising:
    the mobile device being configured with a primary serving cell and at least one secondary serving cell which is deactivated;
    the mobile device applying the DRX operation to the primary serving cell;
    the mobile device not applying the DRX operation to the at least one secondary serving cell which is deactivated;
    when the mobile device receives, upon the at least one secondary serving cell being deactivated and the DRX operation having been applied on the primary cell, an activation MAC (Medium Access Control) control element for activating the at least one secondary serving cell, applying the DRX operation to the at least one secondary serving cell according to the activation MAC control element; and
    applying the DRX operation on the primary serving cell and the activated at least one secondary serving cell when a DRX Inactivity Timer expires.

2. The method of claim 1 further comprising activating the at least one secondary serving cell when the control element is received.

3. The method of claim 1, wherein the at least one secondary serving cell is at deactivation state before the control element is received.

4. A communication device for applying discontinuous reception (DRX) operation in a wireless communication system, the communication device comprising:
    means for the wireless communication device being configured with a primary serving cell and at least one secondary serving cell which is deactivated;
    means for the wireless communication device applying the DRX operation to the primary serving cell, and not applying the DRX operation to the at least one secondary serving cell which is deactivated;
    means for when the communication device receives, upon the at least one secondary serving cell being deactivated and the DRX operation having been applied on the primary cell, an activation MAC (Medium Access Control) control element for activating the at least one secondary serving cell, applying the DRX operation to the at least one secondary serving cell according to the activation MAC control element; and
    means for the wireless communication device applying the DRX operation on the primary serving cell and the activated at least one secondary serving cell when a DRX Inactivity Timer expires.

5. The communication device of claim 4 further comprising activating the at least one secondary serving cell when the control element is received.

6. The communication device of claim 4, wherein the at least one secondary serving cell is at deactivation state before the control element is received.

* * * * *